(12) United States Patent
Miles

(10) Patent No.: US 11,931,938 B2
(45) Date of Patent: Mar. 19, 2024

(54) ULTRASONIC INJECTION MOULDING

(71) Applicant: Matrix Moulding Systems Limited, Welby (GB)

(72) Inventor: Andrew Miles, Stamford (GB)

(73) Assignee: Matrix Moulding Systems Limited, Welby (GB)

( * ) Notice: Subject to any disclaimer, the term of this patent is extended or adjusted under 35 U.S.C. 154(b) by 218 days.

(21) Appl. No.: 17/298,389

(22) PCT Filed: Nov. 28, 2019

(86) PCT No.: PCT/EP2019/083004
§ 371 (c)(1),
(2) Date: May 28, 2021

(87) PCT Pub. No.: WO2020/109522
PCT Pub. Date: Jun. 4, 2020

(65) Prior Publication Data
US 2022/0097272 A1 Mar. 31, 2022

(30) Foreign Application Priority Data
Nov. 28, 2018 (GB) .................................. 1819346

(51) Int. Cl.
*B29C 45/46* (2006.01)
*B29C 45/27* (2006.01)
*B29C 45/57* (2006.01)

(52) U.S. Cl.
CPC ........ *B29C 45/572* (2013.01); *B29C 45/2703* (2013.01); *B29C 2791/008* (2013.01)

(58) Field of Classification Search
CPC ............................. B29C 45/56; B29C 45/568
See application file for complete search history.

(56) References Cited

U.S. PATENT DOCUMENTS

| | | | |
|---|---|---|---|
| 3,523,147 | A | 8/1970 | Hold et al. |
| 4,500,280 | A | 2/1985 | Astier et al. |
| 5,017,311 | A | 5/1991 | Furusawa et al. |
| 5,885,495 | A | 3/1999 | Ibar |
| 6,190,601 | B1 | 2/2001 | Nakamura |
| 6,203,747 | B1 | 3/2001 | Grunitz |
| 2006/0165832 | A1 | 7/2006 | Allan et al. |

FOREIGN PATENT DOCUMENTS

| | | |
|---|---|---|
| CN | 201394904 Y | 2/2010 |
| CN | 102490336 A | 6/2012 |
| CN | 106239861 A | 12/2016 |
| DE | 102016125931 A1 | 7/2018 |
| JP | 2009-226936 A | 10/2009 |

*Primary Examiner* — Thu Khanh T. Nguyen
(74) *Attorney, Agent, or Firm* — Hodgson Russ LLP

(57) ABSTRACT

An apparatus (10) for improving the flow properties of injection moulding material has a flow chamber (18) that is formed in an injection moulding assembly. The flow chamber includes an ultrasonic vibration device (22), and an outlet (20) through which injection moulding material can pass from the flow chamber towards a mould tool (14, 16). The ultrasonic vibration device is arranged in the flow chamber such that injection moulding material flows along an outer wall (41) of the ultrasonic vibration device, in use.

13 Claims, 14 Drawing Sheets

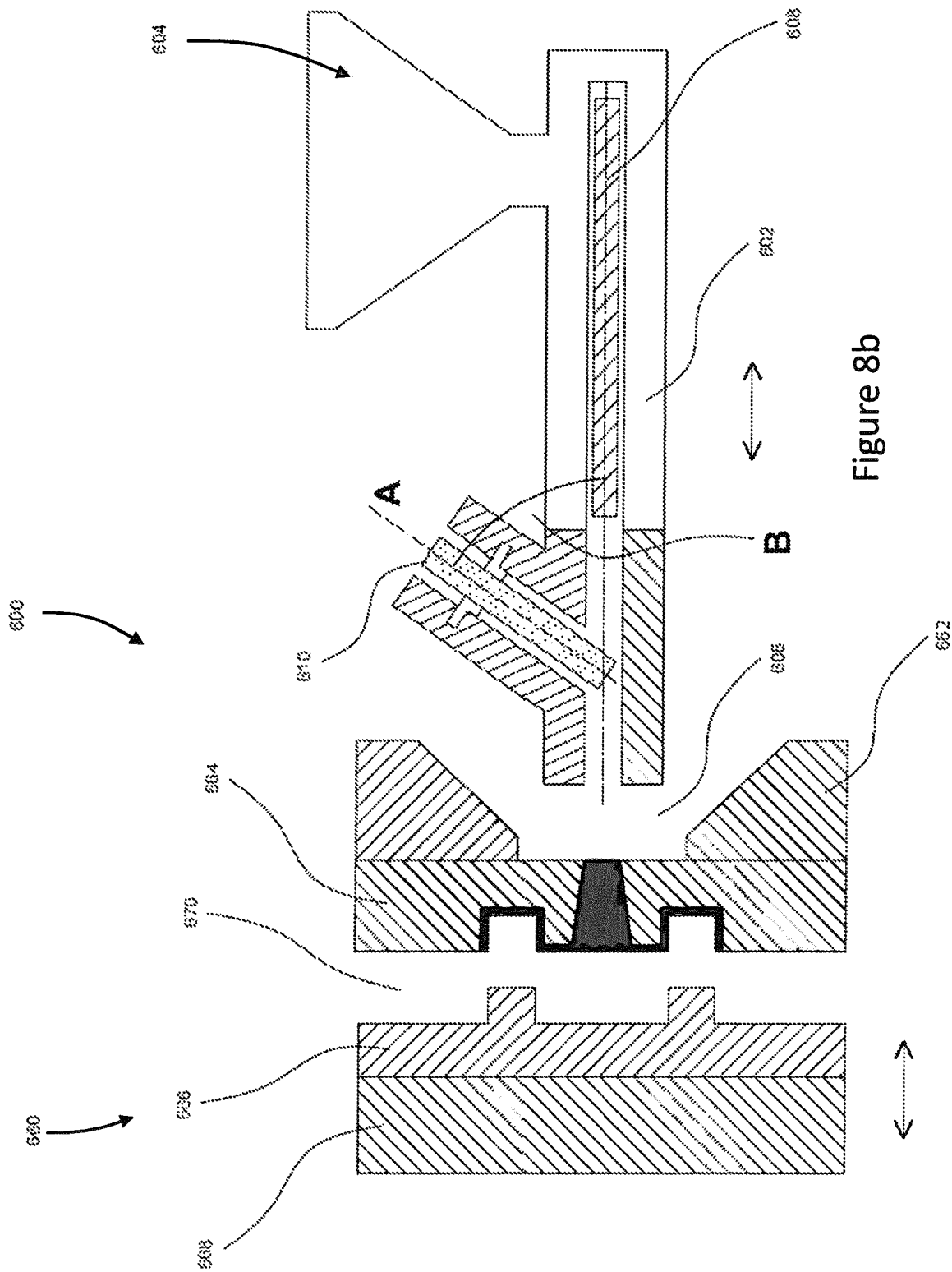

ULTRASONIC INJECTION MOULDING

The present invention is concerned with improvements in ultrasonic injection moulding. More particularly, the present invention is concerned with an apparatus for improving the flow properties of injection moulding material.

The application of ultrasonic vibrations to a polymer during an injection moulding process is known to improve the melt flow characteristics of the polymer being processed.

U.S. Pat. Nos. 4,500,280, 5,885,495 and 6,203,747 each describe injection moulding apparatuses including devices for applying ultrasonic vibrations to the moulding material. Although the use of ultrasound improves the flow characteristic of the moulding material, the devices of these apparatuses cannot be retrofitted to existing injection moulding apparatus.

U.S. Pat. Nos. 5,885,495 and 5,017,311 describe alternative injection moulding apparatuses that include ultrasonic vibration devices. Each of these apparatuses suffer the disadvantage of increased cycle times and, therefore, reduced productivity.

EP 1 536 936 describes an injection moulding apparatus including an ultrasonic vibration device. A length of the ultrasonic vibration device extends into a flow path in a fixed part of the moulding tool. A substantial portion of the material that passes through the flow path passes adjacent an end surface of the vibration device and an opposing wall of the chamber. The apparatus is designed such that an end of the vibration device is in direct contact with material passing through the flow path, in use.

JP 2009-226936 discloses an injection moulding machine with an ultrasonic transducer in the melt flow. The oscillator is positioned within the molten material chamber.

According to a first aspect of the invention, there is provided an apparatus for improving the flow properties of injection moulding material, the apparatus having a flow chamber that is formed in an injection moulding assembly, the apparatus including an ultrasonic vibration device, and an outlet through which injection moulding material can pass from the flow chamber towards a mould tool; and wherein the ultrasonic vibration device is arranged in the flow chamber such that injection moulding material flows along an outer wall of the ultrasonic vibration device, in use.

Advantageously, the apparatus is configured such that ultrasonic energy is transferred to the injection moulding material from the outer wall or periphery of the ultrasonic vibration device, which improves the melt flow properties of the injection moulding material without causing degradation of the material, for example by polymer chain scission.

Preferably the ultrasonic vibration device comprises an oscillator, wherein the oscillator is positioned on a first side of a wall of the flow chamber, and the sonotrode at least partially positioned on a second side of the wall of the flow chamber such that the oscillator does not contact the injection moulding material. This allows e.g. piezoelectric oscillators to be used which would not perform at the temperatures of the melt flow.

Preferably the sonotrode is mounted to the apparatus at a mounting position, wherein the mounting position is at a null point of the sonotrode in use. More preferably the null point of the sonotrode is a null point when the sonotrode is exposed to a temperature gradient of at least 100 C along its axial length. More preferably the sonotrode comprises a mounting flange integral therewith, the mounting flange positioned at the mounting position. The mounting flange may be clamped between two components of the apparatus, for example by metal to metal contact. Advantageously this allows the sonotrode to be clamped without causing vibration damage to the surrounding equipment.

The flow chamber may form part of a hot runner system. The chamber wall is heated in such an embodiment.

The outlet may be in communication with a hot runner body, incorporating either a valve or a hot tip outlet. A portion of the outer wall of the sonotrode may be positioned adjacent to the outlet. In this way the volume of material that is subjected to ultrasonic vibration, but not transferred to the mould tool in a single injection moulding cycle, is minimised.

The flow chamber may have a first end and a second end. The outlet may be positioned adjacent to the second end of the flow chamber.

The outlet may be in communication with an elongate valve channel, the valve channel in communication with the mould tool cavity of the injection moulding assembly. Preferably a portion of the outer wall of the sonotrode is positioned adjacent to the valve channel. An opening may be provided adjacent to the outlet valve channel, wherein the sonotrode extends through the opening into the flow chamber. The sonotrode may extend normal to the valve channel The sonotrode may extend towards a free end in a direction directly opposed to the flow of material through the flow chamber in use—i.e. a "contra flow" arrangement.

In one embodiment, the flow chamber is a valve channel, and the sonotrode extends along the valve channel towards the outlet. In such an embodiment the sonotrode may form part of the valve.

The sonotrode may be arranged to move between an open position, in which an end of sonotrode is spaced apart from the second end of the elongate body such that, in use, injection moulding material can flow through the elongate body and along the outer wall of the ultrasonic vibration device to the mould tool, and a closed position, in which the end of the sonotrode is adjacent to the second end of the elongate body such that injection moulding material is prevented from flowing through the elongate body to the mould tool.

The valve-type sonotrode may be mounted in a sonotrode carriage, which sonotrode carriage is configured to move to place the sonotrode in the open and closed positions, wherein the sonotrode is mounted to the carriage by a mounting formation positioned at a null point of the sonotrode. A flexible seal member may be provided between the sonotrode carriage and the chamber wall. The flexible seal member may be a metal diaphragm seal. Advantageously, this removes the need to attempt to seal a vibrating shaft against the surrounding componentry, which would present significant technical challenges.

The sonotrode may have a cap that is arranged to cover the end portion of the ultrasonic vibration device. The position of the cap relative to the end portion of the ultrasonic vibration device may be adjustable. The ultrasonic vibration device may comprise a free end, and the free end is engaged in a wall of the flow chamber.

The sonotrode may extend in a direction that is transverse to a flow path of injection moulding material that passes through the flow chamber, in use, and wherein a free end of the ultrasonic vibration device extends into an opposing surface of the flow chamber such that injection moulding material flows around an outer wall of the ultrasonic vibration device, in use.

The flow chamber may be formed in a movable component of the injection moulding assembly The ultrasound vibration device may be switched on to expose the injection moulding material to ultrasonic vibrations when the ultrasonic vibration device is in the open position within the elongate body. The ultrasound vibration device is switched off when the ultrasonic vibration device is in the closed position within the elongate body. In this way, the time for which the injection moulding material is exposed to the ultrasonic vibrations can be controlled to prevent degradation of the injection moulding material. Specifically, only moving material is exposed to sonification, which eliminates the possible degradation associated with static material adjacent the sonotrode.

The ultrasonic vibration device may be a first ultrasound vibration device, and the apparatus may include at least one further ultrasound vibration device. A plurality of valve channels may be provided in fluid communication with the mould tool cavity, wherein the first ultrasound vibration device is associated with a first valve channel, and the second ultrasound vibration device is associated with a second valve channel.

The cap may be mounted in an inner surface of the flow chamber. The position of the cap relative to the inner surface of the flow chamber may, preferably, be adjustable. The cap may include an upper surface having a recess into which an end portion of the sonotrode can be slidably fitted. The cap may be adjustable such that the upper surface may either be: (a) raised such that it protrudes into the flow chamber, (b) level with an inner surface of the flow chamber, or (c) embedded or sunk below the inner surface of the flow chamber.

The flow chamber may be formed in a movable component of the injection moulding assembly, for example the movable component may be a barrel or a movable component of the mould tool.

According to a second aspect of the present invention, there is provided a method of injection moulding a workpiece comprising the steps of:
    providing an injection moulding assembly comprising a flow chamber, the flow chamber defining an outlet through which injection moulding material can pass from the flow chamber towards a mould tool cavity for forming the workpiece;
    providing an ultrasonic vibration device comprising a sonotrode disposed at least partially within the flow chamber;
    using the injection moulding assembly initiate a flow of molten injection moulding material through the flow chamber;
    simultaneously with flow initiation, or after the flow has been initiated, activating the ultrasonic vibration device to expose the molten injection moulding material to ultrasonic vibration.

Preferably the flow chamber forms part of a hot runner system.

Preferably the sonotrode forms part of a movable valve member having:
    an open position in which material is permitted to flow from the opening; and,
    a closed position in which material is not permitted to flow from the opening.

Preferably the sonotrode is activated only in the open position (i.e. not in the closed position).

According to a third aspect there is provided a method of manufacturing an ultrasonic vibration device for an injection moulding machine, the device comprising an actuator and a sonotrode, the method comprising the steps of:
    determining a temperature profile across the ultrasonic vibration device in use, the temperature profile ranging across at least 100 C;
    determining the modified size and/or shape of the ultrasonic vibration device under the influence of the temperature profile;
    determining a null point on the sonotrode at a predetermined frequency of the ultrasonic vibration device;
    selecting a location of a mounting flange of the sonotrode coincident with the null point; manufacturing the sonotrode with the mounting flange.

According to a further aspect of the present invention, there is an apparatus for improving the flow properties of injection moulding material, the apparatus having a flow chamber that is formed in an injection moulding assembly, the apparatus including an ultrasonic vibration device that is arranged in the flow chamber such that injection moulding material flows along an outer wall of the ultrasonic vibration device, in use; and wherein the flow chamber is provided on a moving part of the injection moulding assembly. The moving part of the injection moulding assembly may be a moving part of the mould. Alternatively, the moving part may be the barrel of the injection moulding assembly.

According to a yet further aspect of the invention, there is an apparatus for improving the flow properties of injection moulding material, the apparatus having a flow chamber that is formed in an injection moulding assembly, the apparatus including an ultrasonic vibration device, and an outlet through which injection moulding material can pass from the flow chamber towards a mould tool; wherein the ultrasonic device is provided in the outlet.

According to a further aspect of the invention, there is an apparatus for improving the flow properties of injection moulding material, the apparatus having a flow chamber that is formed in an injection moulding assembly, the apparatus including an ultrasonic vibration device, and an outlet through which injection moulding material can pass from the flow chamber towards a mould tool; and wherein the ultrasonic vibration device is arranged in the flow chamber such that the ultrasonic vibration device faces the flow of injection moulding material, in use such that the injection moulding material flows in the direction from a tip to a base of the ultrasonic vibration device.

Examples according to the present invention will now be described with reference to the accompanying Figures, in which:

FIG. 8b is a schematic representation of an injection moulding assembly including a variant of the apparatus of FIG. 7;

Figure 1:
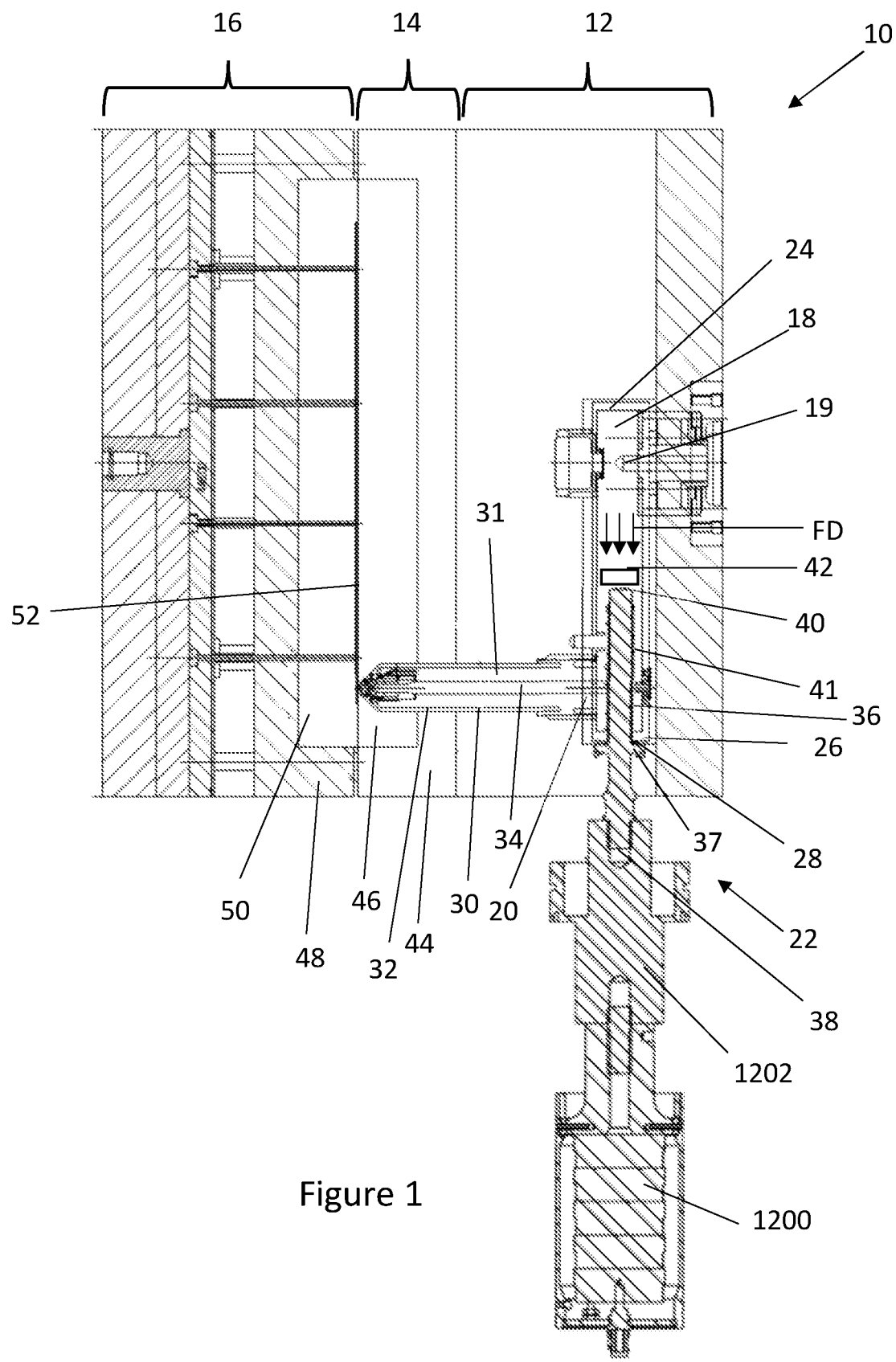
FIG. 1 is a cross section view of an apparatus according to a first embodiment of the invention.

With reference to FIG. 1, there is an apparatus 10 according to a first embodiment of the invention.

The apparatus 10 forms part of a hot runner injection moulding system and thus has a hot runner system 12, a fixed part 14 and a moving part 16.

The hot runner system 12 includes a flow chamber 18 that has an inlet 19, an outlet 20 and an ultrasonic vibration device 22.

The flow chamber 18 is an elongate cavity and has a first end 24 and a second end 26. The inlet 19 is adjacent to the first end 24 of the flow chamber 18. The outlet 20 is adjacent to the second end 26 of the flow chamber 18. The flow chamber 18 also has an opening 28 at the second end 26. As known in the art, the flow chamber 18 is heated by independent heating means (such as resistive elements) to ensure that the material therein remains molten.

The outlet 20 includes a valve 30. The valve 30 has a body 32 defining a valve channel 31 and a pin 34 axially disposed within the valve channel 31. Actuation of the valve 30 causes the pin 34 to move away from an outlet of the valve 30 such that injection moulding material can be transferred out of the flow chamber 18 via the valve 30.

The ultrasonic vibration device 22 includes an ultrasonic probe or sonotrode 36, an oscillator 1200 and a booster 1202. The sonotrode 36 is generally cylindrical and has a first end 38, a second end 40 and an outer wall or surface 41. The sonotrode 36 is constructed from titanium. The oscillator 1200 is in the form of a piezoelectric stack that converts electrical energy into high frequency mechanical vibration (for example vibrations greater than 20 kHz, or preferably between 10 kHz and 40 kHz). The booster 1202 boosts the signal from the oscillator 1200 to the sonotrode 36. The sonotrode 36 comprises a mounting flange 37 that extends radially from the long axis thereof. The mounting flange 37 is clamped by a metal-metal contact. Such a seal can withstand the high pressures of injection (possibly around 2000 bar).

The flange 37 of the sonotrode is positioned such that it lies at a "null point" or "node"—i.e. at a longitudinal position of zero, or minimal movement during activation. The position of the null point is dependent upon a range of factors, but according to the invention is determined by the following method:

i. Determining a temperature gradient across the length of the sonotrode. The sonotrode tip positioned in the flow chamber will be at the flow melt temperature (which may typically be between 200-350 C). The oscillator 1200 needs to be kept below 50 C. Therefore a temperature gradient will be present across the sonotrode, booster and piezoceramic stack.

ii. Calculating the geometry of the sonotrode when exposed to the temperature gradient. The temperature gradient will have an effect on the size and shape (due to thermal expansion) of the sonotrode.

iii. Determining the null point on the sonotrode when exposed to the temperature gradient using the updated geometry.

These steps may be carried out by e.g. finite element analysis. It will be noted that the temperature gradient will be affected by the melt flow temperature, which in turn is determined by the type of material being moulded. Therefore it is envisaged that the sonotrode shape is dependent on the material being moulded.

The ultrasonic vibration device 22 is assembled by connecting the booster 1202 to the oscillator 1200. The first end 38 of the sonotrode 36 is connected to the booster 1202. The booster 1202 acts to concentrate the axial vibration of the piezoelectric stack into the end of the sonotrode.

It is important to note that the oscillator 1200 is positioned on an opposite side of the chamber wall to the chamber 18. This is because the piezoelectric oscillator needs to be kept below a maximum temperature (in this case 50 C) which is far lower than the melt temperature. Positioning of the oscillator in the melt flow would cause damage to it.

The ultrasonic vibration device 22 is assembled onto apparatus 10 such that the sonotrode 36 extends into the chamber 18 through the opening 28. The sonotrode 36 extends through the opening 28 of the flow chamber 18 such that the second end 40 of the sonotrode 36 extends along the length of the flow chamber 18 from the location of the outlet 20 towards the inlet 19. The sonotrode 36 therefore extends in a direction that is parallel to, and contrary to, the flow of injection moulding material that passes through the flow chamber 18, in use.

The ultrasonic vibration device 22 also includes a cap 42 that is arranged to cover the second end 40 of the sonotrode 36. Specifically, the cap 42 is configured to block impinging flow from the inlet 19 from contacting the end of the sonotrode 36. The cap 42 therefore acts as a flow guide to guide the melt flow around to the sidewalls of the sonotrode 36. This ensures that the melt flow is energised at the walls 41 of the sonotrode (specifically in the space between the sonotrode and walls of the chamber 18) in longitudinal shear (i.e. vibrated in the same direction as the flow), which enhances the effects of energisation. The cap 42 is adjustable such that its position relative to the second end 40 of the sonotrode 36 can be adjusted.

The proximity of the sonotrode 36 to the valve 30 allows the volume of material that is subjected to ultrasonic vibration, but not transferred to the mould tool in a single injection moulding cycle, to be minimised.

Referring to FIG. 1, the chamber 18 is configured such that it has a primary flow direction FD from the inlet 19 to the outlet 20. The chamber 18 is configured such that the inlet 19 is spaced apart from the sonotrode 36 such that a linear, laminar flow is created in direction FD before the flow encounters the sonotrode 36 (or specifically the cap 42). This ensures that the melt flow is homogenously energised as is passes from the inlet 19 to the outlet 20.

The fixed part 14 of the apparatus 10 includes a fixed tool bolster 44 and a fixed cavity part 46. The moving part 16 of the apparatus 10 includes a moving tool bolster 48 and a moving cavity part 50. The moving cavity part 50 has an open position, in which the moving cavity part 50 is spaced apart from the fixed cavity part 46 and a closed position, in which the moving cavity part 50 abuts the fixed cavity part, as shown in FIG. 1, and a mould cavity 52 is defined between the fixed cavity part 46 and the moving cavity part 50.

During operation of the apparatus 10, when the moving cavity part 50 is in the closed position, injection moulding material is transferred to the flow chamber 18 from the barrel (not shown) by movement of the screw (not shown). Injection moulding material flows through the flow chamber 18 around the outer wall 41 of the sonotrode 36 to the valve 30. If the valve 30 is open, injection moulding material flows through the vale 30 to the mould cavity 52.

According to the present invention, the sonotrode 36 is activated at the point at which the injection moulding machine begins to inject molten material into the cavity (known as the "injection consent point"). It is important that ultrasonic excitation only occurs when the material to be injected is in motion (i.e. flowing) as excitation of stationary material can be problematic (detrimentally affecting the material's polymer microstructure). The injection moulding material flowing around the outer wall 41 of the sonotrode is exposed to ultrasonic vibrations. In this way, the melt flow properties of the injection moulding material are improved. When injection is paused (once the mould cavity is full), and flow stops, the sonotrode is deactivated ready for the next cycle. The aim is to only energise the moving flow, and not to energise stationary material.

In embodiment of FIG. 1, the sonotrode 36 includes a cap 42 that is arranged to cover the second end 40 of the sonotrode 36. In alternative embodiments of the invention, the second end 40 of the sonotrode 36 may be embedded in a wall of the flow chamber 18 in order to ensure the outer wall 41 of the sonotrode 36 contacts the injection moulding material.

In the embodiment of FIG. 1, the sonotrode 36 is a separate component to the valve 30. In the embodiment of FIG. 1, the sonotrode 36 extends through the flow chamber 18 in a direction that is parallel to the direction in which injection moulding material flows through the flow chamber 18. In contrast, the body 32 of the valve 30 extends in a direction that is not parallel to the direction in which injection moulding material flows through the flow chamber 18. In other embodiments of the invention, the body of the valve could extend in a direction that is parallel to the direction in which injection moulding material flows through the flow chamber.

Figure 2:
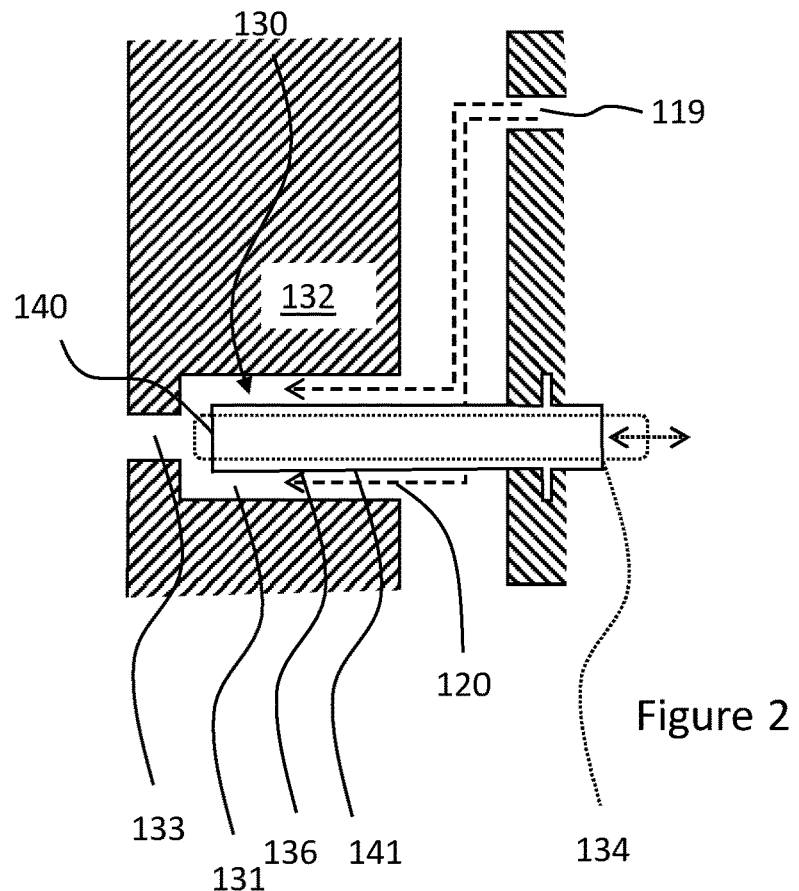
FIG. 2 is a schematic representation of a hot tip for an apparatus according to the invention.

In alternative embodiments of the invention, the sonotrode may be positioned in the valve channel. With reference to FIG. 2, the melt flow passes from an inlet 119 to an outlet 120 of a pre-chamber before entering a valve channel 131. A sonotrode 136 is mounted to the pre-chamber wall opposite the outlet, and extends across the pre-chamber into the valve channel. As such the sonotrode is positioned within a valve channel 131 defined in a body 132 of a valve 130 such that the sonotrode 136 extends along the length of the valve body 132 and terminates in a free, second end 140 proximate the valve outlet 133 (i.e. the gate tip). In this arrangement, the second end 140 of the sonotrode 136 is spaced apart from the outlet 133 of the valve 130 such that injection moulding material can flow through the valve 130 to the mould cavity. The valve member 134 is separate to the sonotrode 136 and is actuable in an axial direction to open and close the valve opening 133 at the gate tip. During the transfer of injection moulding material into the mould cavity, the sonotrode 136 is turned on such that the injection moulding material flowing around the outer wall 141 of the sonotrode 136 is exposed to ultrasonic vibrations. In this way, the melt flow properties of the injection moulding material are improved. It will be noted that the sonotrode 136 spans the pre-chamber to penetrate the valve channel 131.

An alternative example will now be described with reference to FIG. 3. As described with respect to FIG. 2, the melt flow passes from an inlet 219 to an outlet 220 of a pre-chamber before entering a valve channel 231. A sonotrode 236 is positioned within the channel 231 formed in a body 232 of a valve 230 such that the sonotrode 236 extends along the length (i.e. flow path) of the valve body 232. In this arrangement, a projection 243 is provided at the second end 240 of the sonotrode 236. The sonotrode 236 is arranged to move between an open position, in which the projection 243 of the sonotrode 236 is spaced apart from the outlet 233 of the valve 230 such that, in use, injection moulding material can flow through the elongate valve body 232 and along the outer wall 241 of the sonotrode 236 to the mould cavity, and a closed position, in which the second end 240 of the sonotrode 236 abuts a shoulder 235 (which may be perpendicular to the main azis of the sonotrode, or angled/tapered) adjacent to the outlet 233 (gate tip) of the valve 230 such that the outlet 233 is closed by the projection 243 and injection moulding material is prevented from flowing through the elongate valve body 232 to the mould cavity. When the sonotrode 236 is in the open position, the sonotrode 236 is turned on such that the injection moulding material flowing around the outer wall 241 of the sonotrode 236 is exposed to ultrasonic vibrations. In this way, the melt flow properties of the injection moulding material are improved. It will be noted that the sonotrode 136 spans the pre-chamber to penetrate the valve channel 231.

Mounting and reliable sealing of a moving sonotrode is difficult. Specifically, placing a seal between the outer surface of a vibrating sonotrode and a stationary surface presents significant technical problems. Known seals will simply fail very quickly under the action of the vibrational shear energy thereby imparted. As such, this embodiment of the present invention utilises a sonotrode carriage 1100 movably mounted to a wall 1102 of the apparatus of FIG. 3.

The sonotrode 236 comprises a flange 1104 unitary with the sonotrode body. The flange 1104 is positioned at a "null point" of the sonotrode—that is a point at which the amplitude of vibration during resonance is de minimis or zero. The flange 1104 is clamped between a first carriage member 1106 and a second carriage member 1108 such that the sonotrode 236 is fixed to the carriage 1100.

The carriage 1100 is received in an opening in the wall 1102 and sealed against the opening by a metal diaphragm seal 1110 (shown schematically only). This allows axial movement of the sonotrode in direction D whilst keeping the melt flow in the chamber 218, because the diaphragm seal can deform whilst maintaining a seal. An actuator 1112 is configured to move the carriage 1100 in direction D.

The provision of a carriage prevents the need for sealing the moving and vibrating sonotrode directly against the chamber wall.

Figure 3:
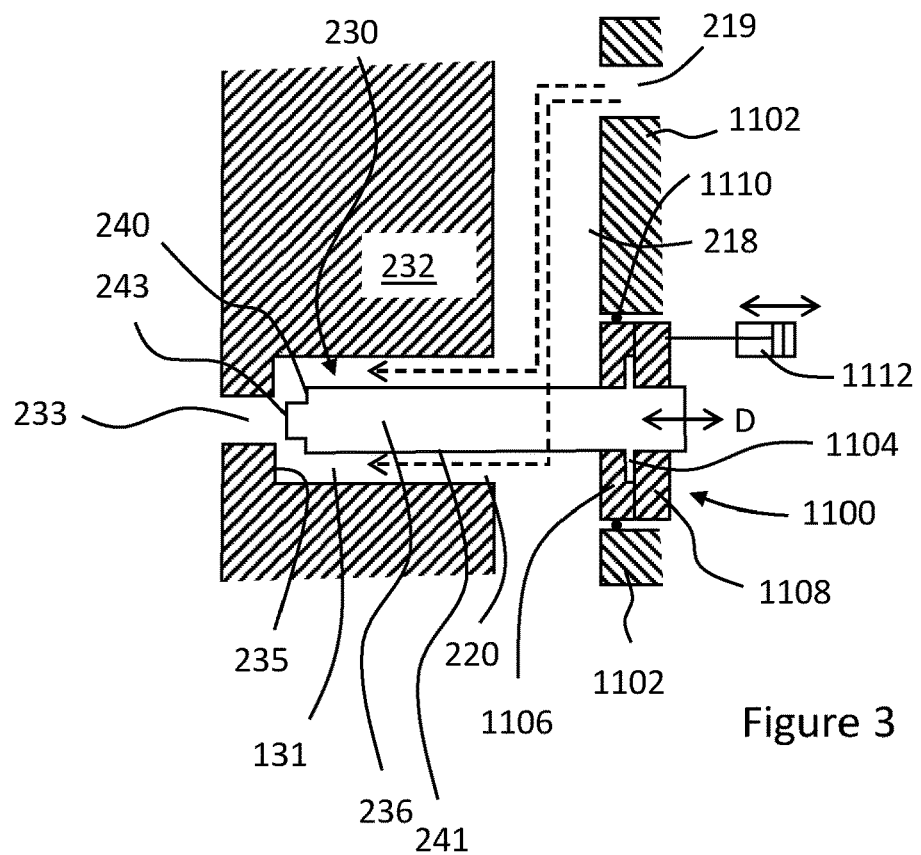
FIG. 3 is a schematic representation of a valve for an apparatus according to the invention.

In a still further embodiment, based on FIG. 3, the second end 240 of the sonotrode may simply bear against the shoulder 235 at the end of the flow channel without the presence of the protrusion 243.

In each of the examples of FIG. 2 and FIG. 3, the proximity of the sonotrodes 136, 236 to the outlet 133, 233 of the valves 130, 230 allows the volume of material that is subjected to ultrasonic vibration, but not transferred to the mould tool in a single injection moulding cycle, to be minimised. This reduces the amount of material whereby the imparted energy dissipates over time.

In the embodiments described above, the apparatuses include a single sonotrode 36, 136, 236. It will be understood that, in alternative embodiments of the invention, the apparatuses may include a plurality of ultrasonic vibration devices. Similarly, in the embodiments described above, the apparatuses include a single valve 30, 130, 230. It will also be understood that, in alternative embodiments of the invention, the flow chamber 18 may include a plurality of valves.

Figure 4:
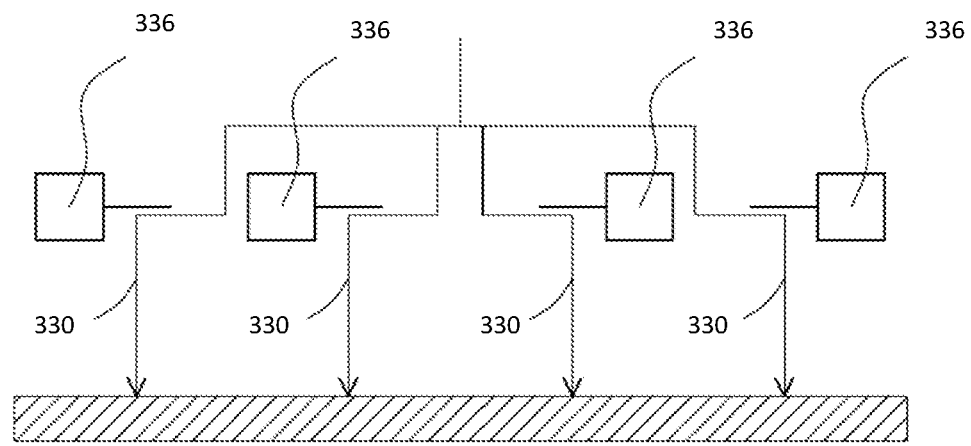
FIG. 4 is a schematic representation of an injection moulding assembly including an apparatus according to an alternative embodiment of the invention.
Figure 5:
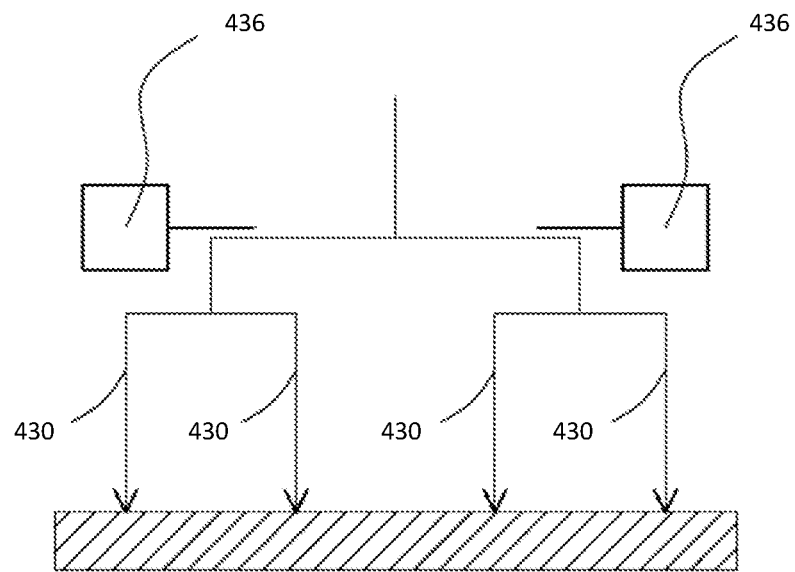
FIG. 5 is a schematic representation of an injection moulding assembly including an apparatus according to an alternative embodiment of the invention.
Figure 6:
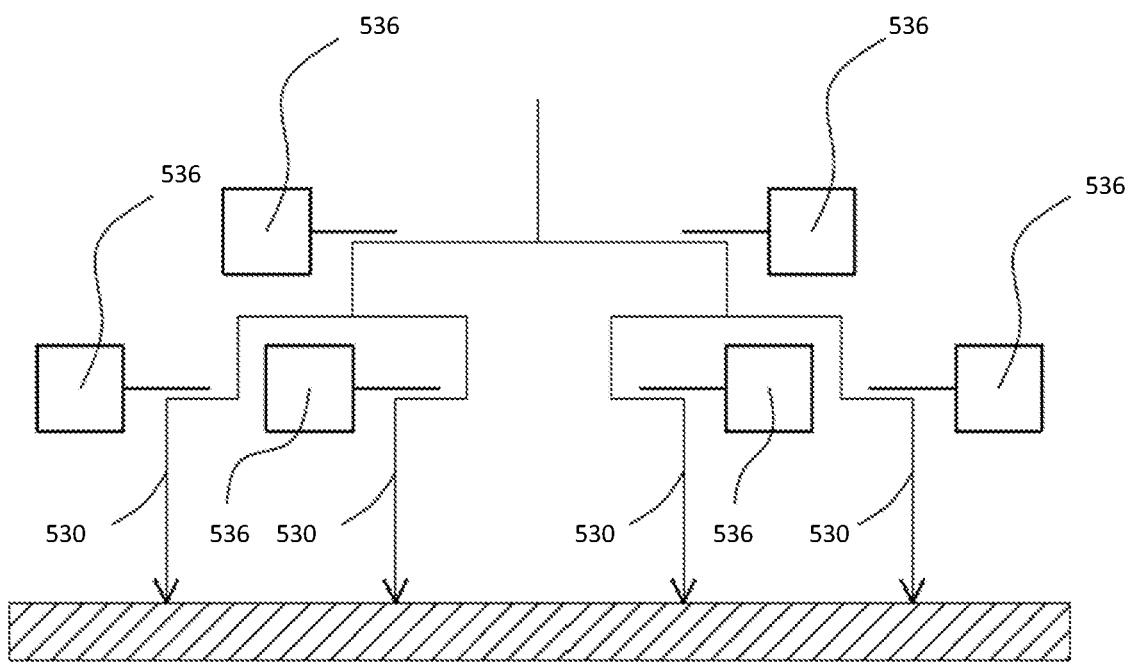
FIG. 6 is a schematic representation of an injection moulding assembly including an apparatus according to an alternative embodiment of the invention.

In one exemplary embodiment of the invention, as shown in FIG. 4, there may be a plurality of valves 330 and each valve 330 may be associated with a sonotrode 336. Alternatively, as shown in FIG. 5, a sonotrode 436 may be associated with two or more valves 430, such that there is less than one sonotrode 436 per valve 430. Alternatively, as shown in FIG. 6, more than one sonotrode 536 may be provided for each valve 530.

Figure 7:
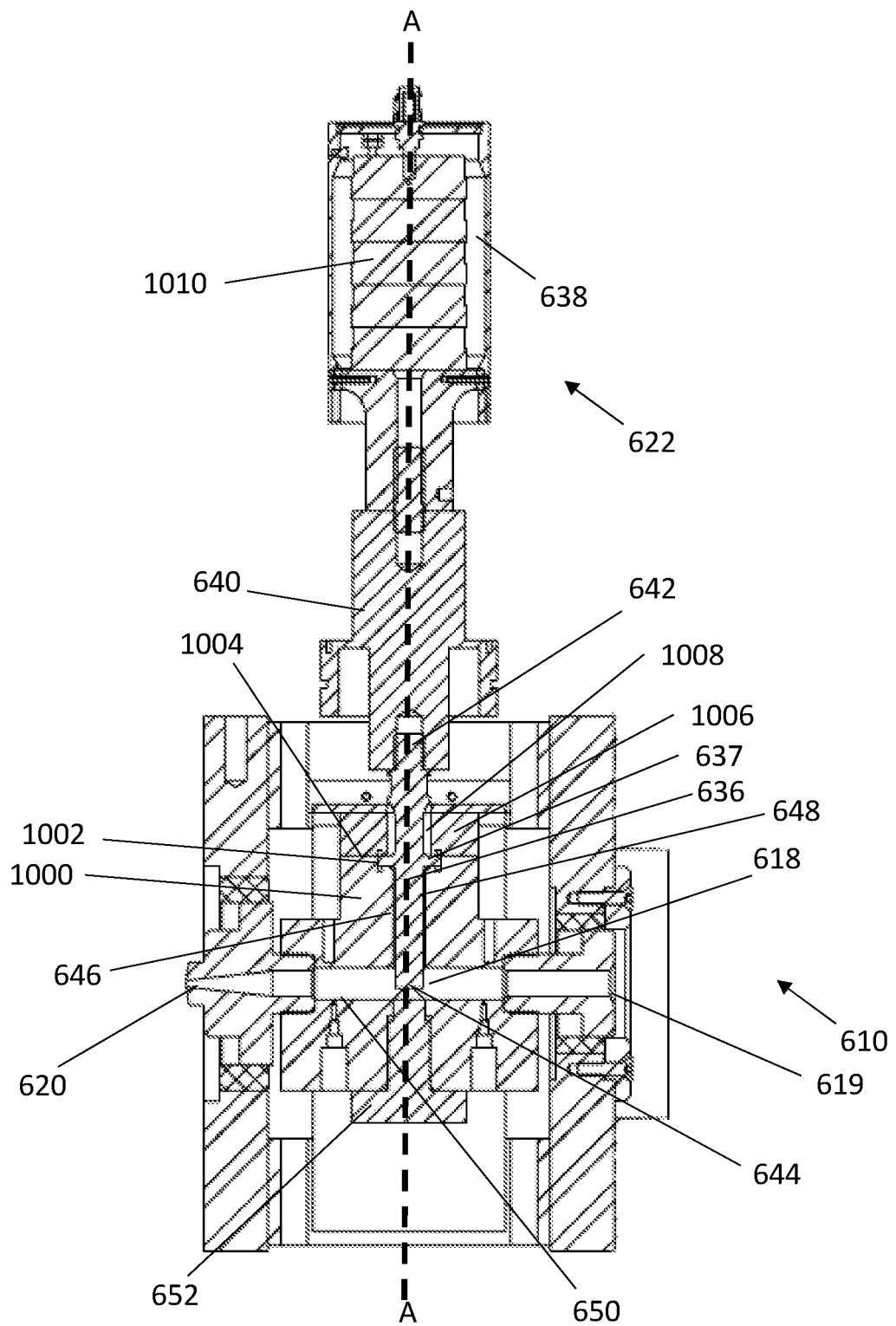
FIG. 7 is a cross section view of an apparatus according to an alternative embodiment of the invention.

With reference to FIG. 7, there is shown an apparatus 610 according to an alternative embodiment of the invention. The apparatus 610 includes a flow chamber 618 that has an inlet 619, an outlet 620 and an ultrasonic vibration device 622. The flow chamber 618 is defined in a chamber body 1000. The body 1000 includes a channel 648 that has an axis A-A and is transverse to the flow chamber 618. The channel 648 terminates in an annular flange seat 1002 in a surface 1004. Abutting the surface 1004 there is provided a clamping body 1006 defining a channel 1008 aligned with the channel 648.

The ultrasonic vibration device 622 includes an ultrasonic probe or sonotrode 636, an oscillator 638 and a booster 640. The sonotrode 636 is generally cylindrical and has a first end 642, a second end 644 and an outer wall or surface 646. The oscillator 638 converts electrical energy into high frequency mechanical vibration (for example vibrations greater than 20 kHz) using a stack of piezoelectric elements 1010. The booster 640 boosts the signal from the oscillator 638 to the sonotrode 636. The sonotrode 636 comprises a mounting flange 637 that extends radially from the long axis thereof. The mounting flange 637 is nested into the annular flange seat 1002 and clamped into position by the clamping body 1006.

The flange 637 of the sonotrode is positioned such that it lies at a "null point" or "node"—i.e. at a longitudinal position of zero, or minimal movement during activation. The position of the null point is dependent upon a range of factors, but according to the invention is determined by the following method:
  i. Determining a temperature gradient across the length of the sonotrode. The sonotrode tip positioned in the flow chamber will be at the flow melt temperature (which may typically be between 200-350 C). The piezoelectric stack 1010 needs to be kept below 50 C. Therefore a temperature gradient will be present across the sonotrode.
  ii. Calculating the geometry of the sonotrode when exposed to the temperature gradient. The temperature gradient will have an effect on the size and shape (due to thermal expansion) of the sonotrode.
  iii. Determining the null point on the sonotrode when exposed to the temperature gradient using the updated geometry.

These steps may be carried out by e.g. finite element analysis. It will be noted that the temperature gradient will be affected by the melt flow temperature, which in turn is determined by the type of material being moulded. Therefore it is envisaged that the sonotrode shape or dimensions is dependent on the material being moulded.

The ultrasonic vibration device 622 is assembled by connecting the booster 640 to the oscillator 638. The first end 642 of the sonotrode 636 is connected to the booster 640. The booster 640 acts to concentrate the axial vibration of the piezoelectric stack into the end of the sonotrode.

The ultrasonic vibration device 622 is assembled onto apparatus 610 such that the sonotrode 636 extends into the channel 648. The sonotrode 636 therefore extends through the channel 648 and the flow chamber 618 towards a lower surface 650 of the flow chamber 618. An adjustable cap or anvil 652 is then mounted onto the apparatus 610 such that the second end 644 of the sonotrode 636 is adjacent to and abuts a portion of the adjustable cap or anvil 652. In use, the sonotrode 636 vibrates in a direction that is parallel to the vertical axis A-A of the channel 648.

The ultrasonic vibration assembly 610 can be installed at different positions on an injection moulding apparatus 600 as will be described with reference to FIGS. 8, 9 and 10.

An exemplary injection moulding apparatus 600 includes a barrel 602 having a hopper 604 at a first end and an outlet in the form of a nozzle 606 at a second end that is opposite the first end. A reciprocating and rotating screw 608 is housed within the barrel 602.

The injection moulding apparatus 600 also includes a fixed platen 662, a moving platen 668 and an injection moulding tool 660. The injection moulding tool 600 includes a fixed mould half 664 and a moving mould half 666. The fixed mould half 664 is fitted to the fixed platen 662. The moving mould half 666 is fixed to the moving platen 668. A mould cavity 670 is defined between the fixed mould half 664 and the moving mould half 666. The movable mould half 666 is movable between an open position in which the mould cavity 670 is open and a closed position in which the mould cavity 670 is closed.

Figure 8A:
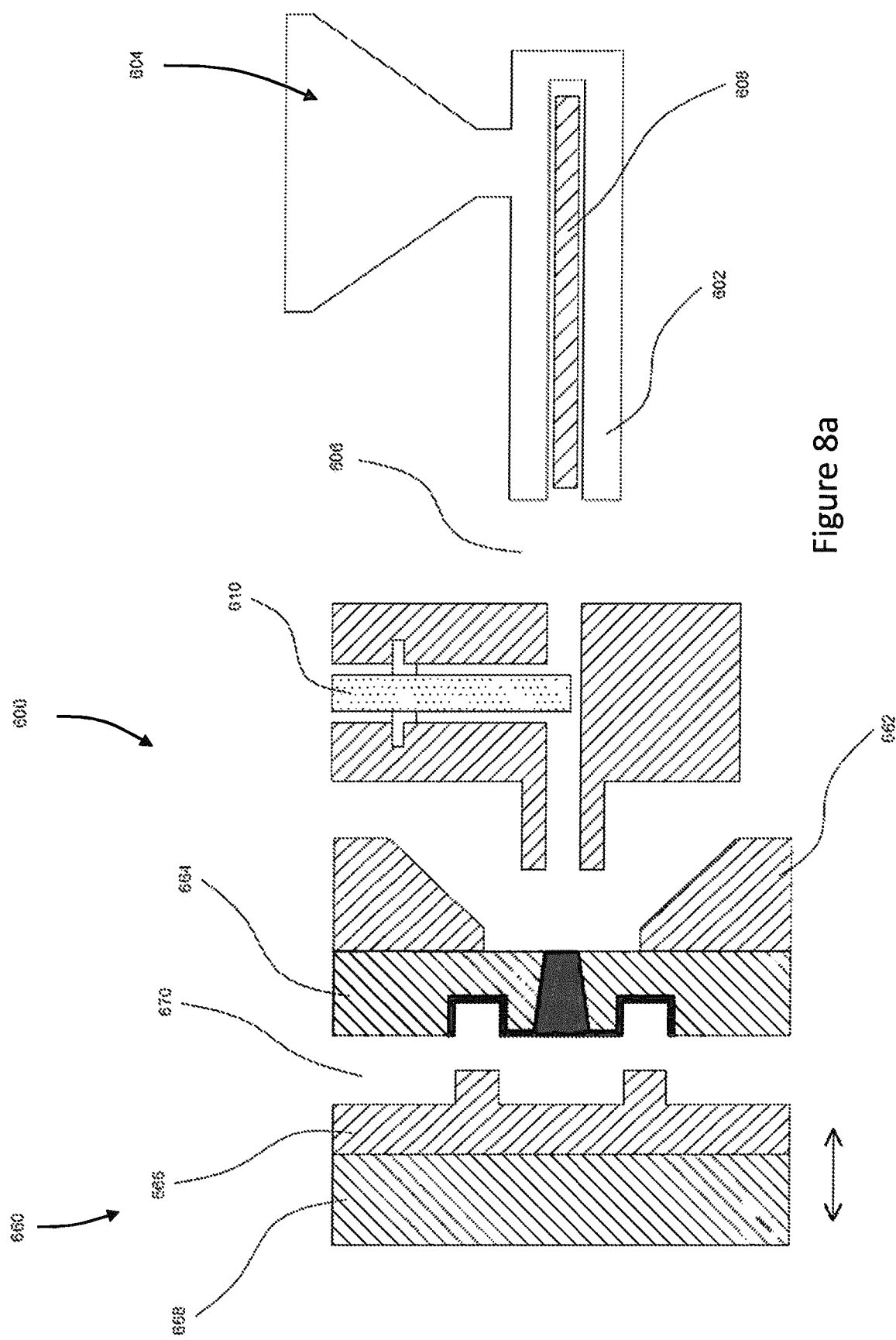
FIG. 8a is a schematic representation of an injection moulding assembly including the apparatus of FIG. 7 in a first position.

With reference to FIG. 8a, the apparatus 610 is installed on the barrel 602 by connecting the inlet 619 of the apparatus 610 to an outlet of the barrel 602. The outlet 620 of the apparatus 610 is connected to an inlet of the fixed mould half 664 supported on a fixed platen 662 such that a melt stream flow path is formed between the barrel 602 and the mould cavity 670.

In use, barrel 602 and apparatus 610 are moved together to an injection port on the fixed mould half, where the injection moulding material flows from the barrel 602 of the injection moulding apparatus 600 to the mould cavity 670 of the injection moulding tool 660.

The sonotrode 636 extends through the flow chamber 618 such that the injection moulding material that is delivered through the melt stream flow path passes around the outer wall 646 of the sonotrode 636 and is exposed to the ultrasonic vibrations from the outer wall 646 of the sonotrode 636.

During operation of the injection moulding apparatus 600, when the injection moulding tool 660 is in the closed position and injection moulding material is being transferred to the mould cavity 670 from the barrel 602 by linear movement of the screw 608, the sonotrode 636 is turned on to improve the melt flow characteristics of the moulding material. Once the injection cycle has been completed, the sonotrode 636 is turned off to prevent degradation of the injection moulding material.

In this arrangement, the apparatus 610 is, advantageously, installed on the barrel 602, i.e. a moving part, of the injection moulding apparatus 600. It is, therefore, possible for the apparatus 610 to be retrofitted to existing injection moulding apparatuses. This arrangement can be installed on injection moulding apparatuses independently of the mould tool and thus allows the ultrasonic vibrations to be applied to different mould tools. This arrangement maximises the daylight that is available within the injection moulding apparatus, for example for the production of deep draw articles.

FIG. 8b shows a variant of the arrangement of FIG. 8a in which the apparatus 610 is integrated between the barrel 602 and the nozzle tip 606. This provides a more compact arrangement, and can facilitate exposure of the flow at a position closer to the mould cavity (reducing the "dwell" volume between sonotrode and cavity). In this embodiment, the axis A of the apparatus 610 is inclined to the axis of the barrel by an angle B where B<90 degrees. In this instance. B=45 degrees. The angle is such that the free end of the sonotrode is directed towards the cavity. This allows the sonotrode to be positioned further towards the nozzle top 606 without the bulkier part of the apparatus 610 (e.g, the piezoelectric oscillator) contacting the platen 662. Further, the melt flow first contacts the sides of the sonotrode, which is beneficial for viscosity reduction.

Figure 9:
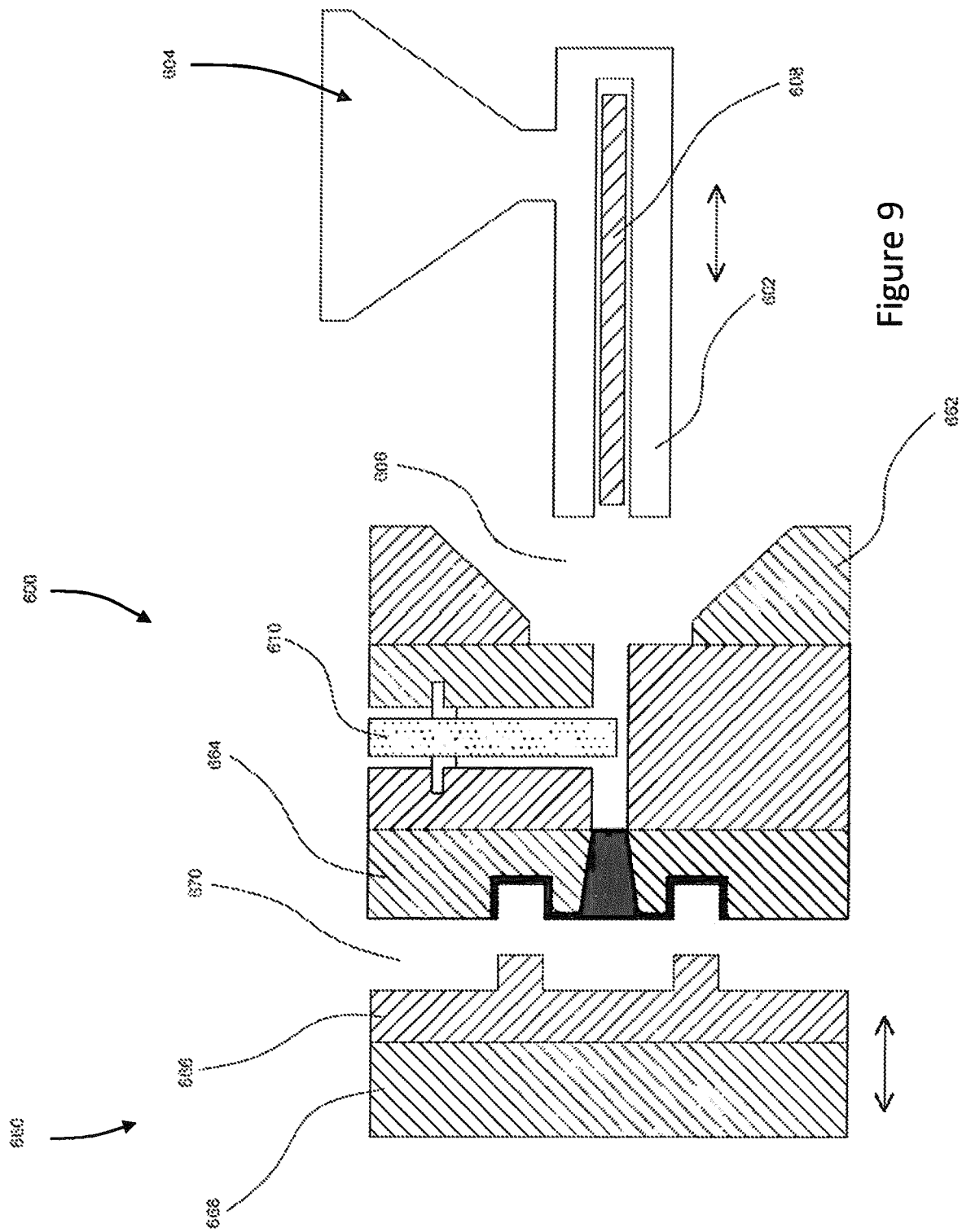
FIG. 9 is a schematic representation of an injection moulding assembly including the apparatus of FIG. 7 in a second position.
Figure 10:
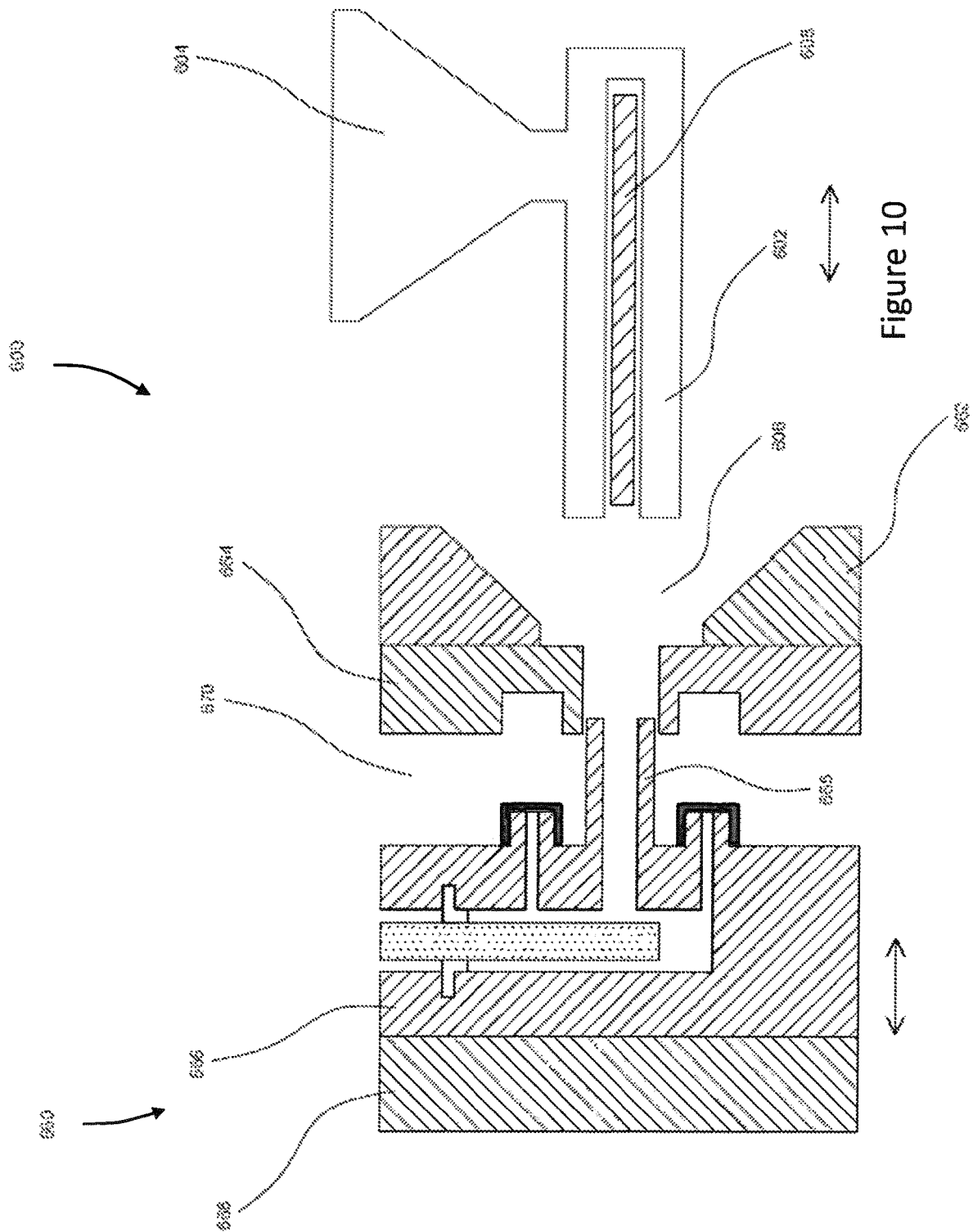
FIG. 10 is a schematic representation of an injection moulding assembly including the apparatus of FIG. 7 in a third position.

With reference to FIG. 9, the apparatus 610 is installed between the fixed platen 662 and the fixed mould half 664 of the injection moulding tool 660.

The apparatus 610 is connected to the inlet of the fixed mould half 664 of the injection moulding tool 660. Injection moulding material can thus be transferred from the barrel 602 to the mould cavity 670 via the flow chamber 618 of the apparatus 610 and the fixed mould half 664 during use of the injection mould apparatus 600.

As described in relation to FIG. 8, the sonotrode 636 extends through the flow chamber 618 such that the injection moulding material that is delivered through the melt stream flow path passes around the outer wall 646 of the sonotrode 636 and is exposed to the ultrasonic vibrations from the outer wall 646 of the sonotrode 636.

During operation of the injection moulding apparatus 600, when the injection moulding tool 660 is in the closed position and injection moulding material is being transferred to the mould cavity 670 from the barrel 602 by linear movement of the screw 608, the sonotrode 636 is turned on to improve the melt flow characteristics of the moulding material. Once the injection cycle has been completed, the sonotrode 636 is turned off to prevent degradation of the injection moulding material.

In this arrangement, the apparatus 610 can, advantageously, be installed on the fixed mould half 664, i.e. a fixed part, of the injection moulding apparatus 600. It is, therefore, possible for the apparatus 610 to be retrofitted to existing injection moulding apparatuses. The fixing of the apparatus 610 to the fixed mould half allows a particular mould to be used with the ultrasonic apparatus on any injection moulding assembly.

The apparatus 610 can, alternatively, be installed on an injection moulding apparatus 600 as described with reference to FIG. 10. In this example, the apparatus 610 is installed on the moving mould half 666.

Injection moulding material is transferred from the barrel 602 to the mould cavity 670 via a melt tube 665 that is attached to the moving mould half 666. In this arrangement, there is no flow path through the fixed platen 662 or the fixed mould half 664 (other than through the melt tube 665).

As described in relation to FIGS. 8 and 9, the sonotrode 636 extends through the flow chamber 618 such that the injection moulding material that is delivered through the melt stream flow path passes around the outer wall 646 of the sonotrode 636 and is exposed to the ultrasonic vibrations from the outer wall 646 of the sonotrode 636.

During operation of the injection moulding apparatus 600, when the injection moulding tool 660 is in the closed position and injection moulding material is being transferred to the mould cavity 670 from the barrel 602 by linear movement of the screw 608, the sonotrode 636 is turned on to improve the melt flow characteristics of the moulding material. Once the injection cycle has been completed, the sonotrode 636 is turned off to prevent degradation of the injection moulding material.

In this arrangement, the apparatus 610 can, advantageously, be installed on the moving mould half 666, i.e. a moving part, of the injection moulding apparatus 600. It is, therefore, possible for the apparatus 610 to be retrofitted to existing injection moulding apparatuses. The fixing of the apparatus 610 to the moving mould half advantageously enables the production of in-mould decoration and the use of double-daylight moulds.

Figure 11:
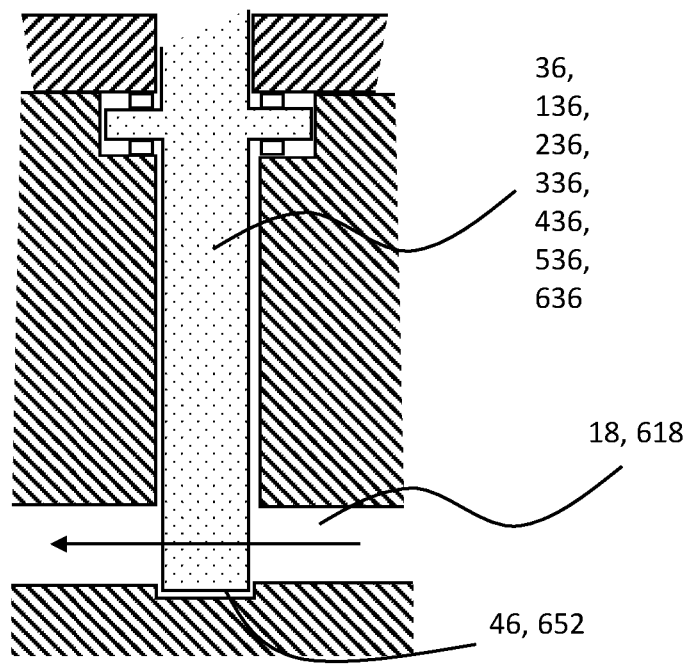
FIG. 11 is a schematic representation of an ultrasonic vibration device for inclusion in an apparatus according to the invention.
Figure 12:
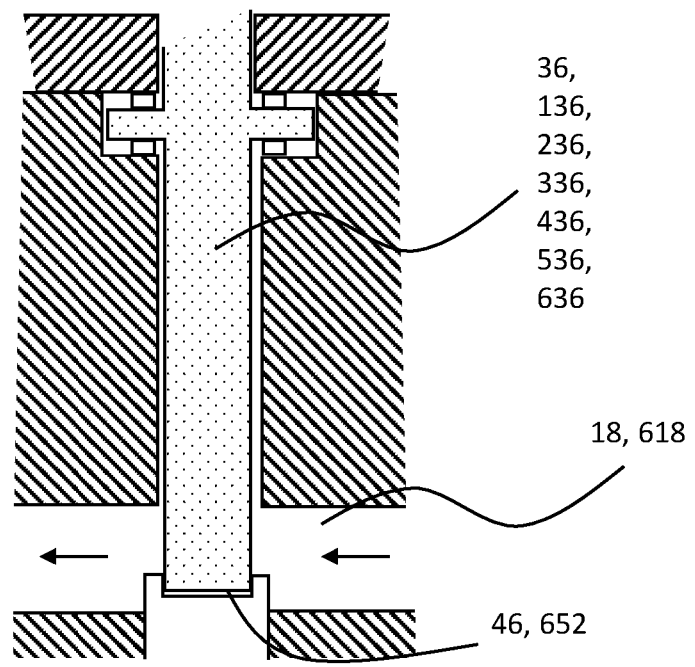
FIG. 12 is an alternative schematic representation of an ultrasonic vibration device for inclusion in an apparatus according to the invention.

In each of the embodiments described above, the sonotrode extends through the flow path such that the second end of the sonotrode is adjacent to and abuts a structure, for example an adjustable cap, also known as an "anvil". With reference to FIG. 11, the adjustable cap 42, 652 may be positioned such that the sonotrode 36, 136, 236, 336, 436, 536, 636 is received in the wall of the flow chamber 18, 618. Alternatively, as shown in FIG. 12, the adjustable cap 46, 652 may be positioned such that the adjustable cap 42, 652 extends above the inner wall of the flow chamber 18, 618. In a yet further embodiment of the invention, the adjustable cap may have an upper surface and be positioned in the wall of the flow chamber such that the upper surface of the adjustable cap is level with the inner wall of the flow chamber. In each case, the cap 46, 652 receives the tip of the sonotrode to inhibit significant flow past the tip, and instead focus flow around the sidewalls of the sonotrode.

Figure 13:
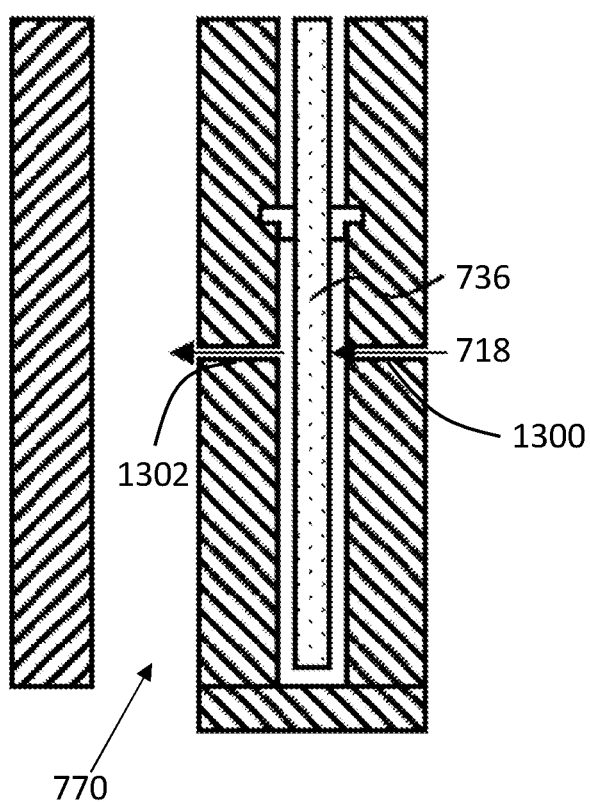
FIG. 13 is a schematic representation of an apparatus of an alternative embodiment of the present invention.

In yet further embodiments of the invention, the flow path around the walls of the sonotrode may be varied. For example, and as shown in FIG. 13, the flow path 718 to the mould cavity 770 may run past a central portion of the sonotrode 736. In particular a chamber inlet 1300 and chamber outlet 1302 are defined on either side of the sonotrode 736, in which the inlet 1300 and outlet 1302 are opposite each other (i.e. the same distance from the tip of the sonotrode). This reduces flow past the tip, and instead provides flow around the sides of the sonotrode.

Figure 14:
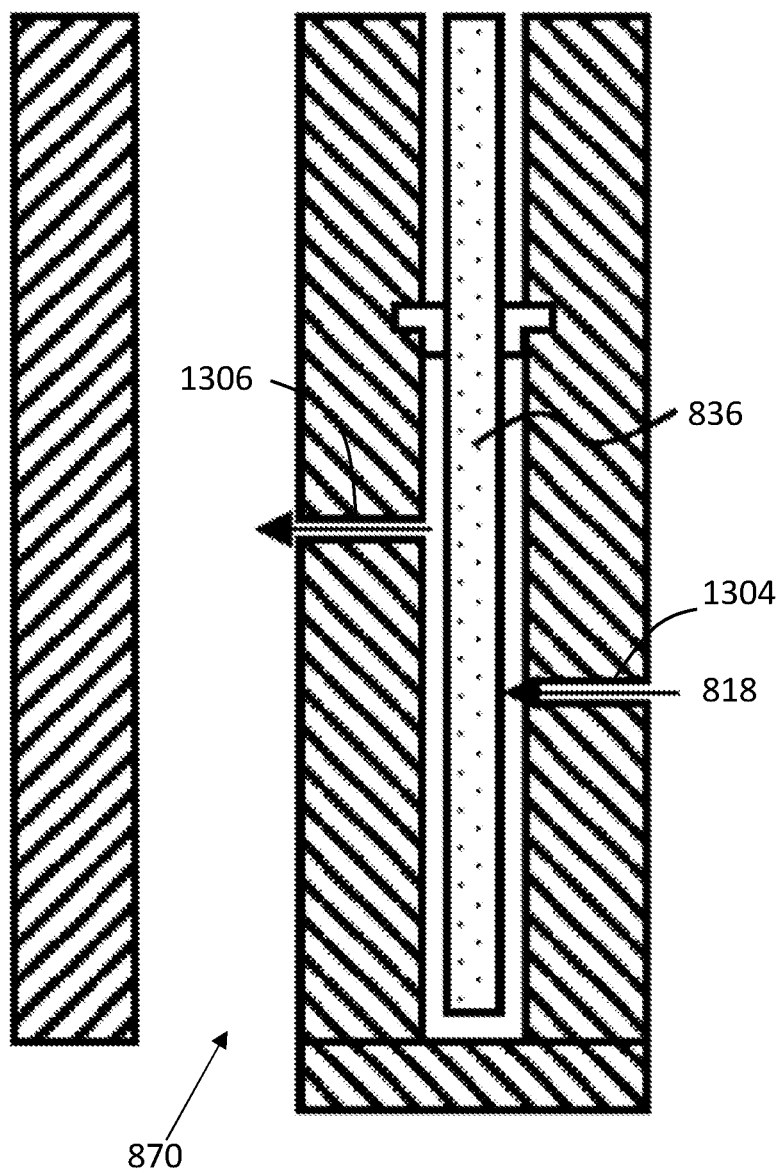
FIG. 14 is a schematic representation of an apparatus of an alternative embodiment of the present invention.
Figure 15:
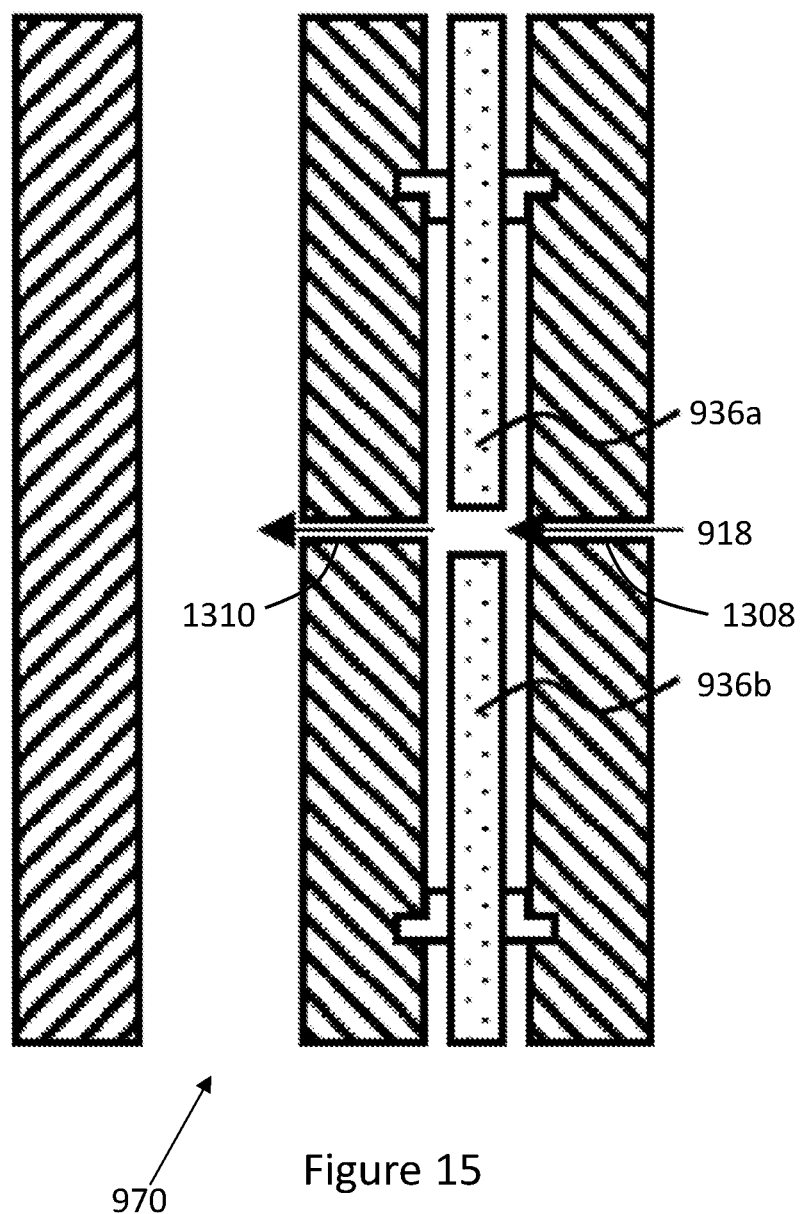
FIG. 15 is a schematic representation of an apparatus of an alternative embodiment of the present invention.

Alternatively, and as shown in FIG. 14, the flow path 818 to the mould cavity may be staggered such that an outlet 1306 is positioned further from the tip of the sonotrode than the inlet 1304. This also reduces flow past the tip, and instead provides flow around the sides of the sonotrode.

In a yet further embodiment of the invention, more than one sonotrode 936a, 936b may be provided and the flow path 918 to the mould cavity 970 between an inlet 1308 and an outlet 1310 may be provided via a gap 921 between adjacent sonotrodes 936a, 936b.

In the described embodiments of the invention, the sonotrode is turned on during the injection cycle in order to optimise the melt flow properties of the injection moulding material. The sonotrode is turned off upon completion of the injection stroke in order to prevent degradation of the material. It will be understood that, in alternative embodiments of the invention, the stage of the process at which the sonotrode is turned on or turned off may be adjusted according to the characteristics of the injection moulding material.

Features of the above embodiments may be combined to suit the application in question. For example, the provision of a sonotrode with an integral fixing flange at the null point may be provided with any of the embodiments, and indeed is the preferred way to mount the sonotrodes according to the present invention.

The invention claimed is:

1. A method of injection moulding comprising the steps of:
   providing an apparatus having a flow chamber that is formed in an injection moulding assembly and includes:
   an ultrasonic vibration device comprising a sonotrode, and
   an outlet through which injection moulding material can pass from the flow chamber towards a mould tool cavity;
   wherein the sonotrode is at least partially arranged in the flow chamber;
   using the injection moulding assembly to injection mould a part, such that injection moulding material flows along an outer wall of the sonotrode by:
   starting an injection cycle by using the injection moulding assembly to initiate a flow of molten injection moulding material from the flow chamber through the outlet;
   simultaneously with flow initiation through the outlet, or after the flow has been initiated, turning the ultrasonic vibration device from an off-state to an on-state to expose the molten injection moulding material in the flow chamber to ultrasonic vibration during flow; and
   turning the ultrasonic vibration device from the on-state to the off-state when the mould tool cavity is full, such that static molten injection moulding material in the flow chamber is not exposed to ultrasonic vibration before the next injection cycle is started.

2. The method according to claim 1, wherein the ultrasonic vibration device comprises an oscillator, the oscillator is positioned on a first side of a wall of the flow chamber, the sonotrode is at least partially positioned on a second side of the wall of the flow chamber, wherein turning the ultrasonic vibration device from the off-state to the on-state exposes the molten injection material to ultrasonic vibration by contact with the sonotrode, and the oscillator does not contact the injection moulding material.

3. The method according to claim 1, wherein the ultrasonic vibration device is mounted to the apparatus at a mounting position, wherein the mounting position is at a null point of the ultrasonic vibration device when turning the ultrasonic vibration device from the off-state to the on-state.

4. The method according to claim 3, wherein the null point of the ultrasonic vibration device is a null point when the sonotrode is exposed to a temperature gradient of at least 100 C along its axial length, and turning the ultrasonic vibration device from the off-state to the on-state causes zero longitudinal movement of the sonotrode.

5. The method according to claim 1, further comprising heating the flow chamber during the injection cycle.

6. The method according to claim 5, wherein heating the flow chamber comprises heating a wall of the flow chamber during the injection cycle.

7. The method according to claim 1, wherein starting the injection cycle causes the flow of molten injection moulding material to flow in a direction directly opposed to an extension direction of the sonotrode.

8. The method according to claim 1, wherein starting the injection cycle comprises opening a valve member to permit flow of the molten injection moulding material from the flow chamber through the outlet.

9. The method according to claim 8, wherein the sonotrode forms part of the valve member.

10. The method according to claim 1, wherein starting the injection cycle causes the flow of molten injection moulding material to flow in a direction that is transverse to an extension direction of the sonotrode and is around an outer wall of the ultrasonic vibration device.

11. The method according to claim 1, wherein the ultrasonic vibration device is a first ultrasound vibration device; wherein the apparatus includes a second ultrasound vibration device; and wherein the method further comprises:
    simultaneously with flow initiation through the outlet, or after the flow has been initiated, turning the second ultrasound vibration device from an off-state to an on-state to expose the molten injection moulding material in the flow chamber to ultrasonic vibration during flow; and
    turning the second ultrasound vibration device from the on-state to the off-state when the mould tool cavity is full, such that statis molten injection moulding material in the flow chamber is not exposed to ultrasonic vibration before the next injection cycle is started.

12. The method according to claim 11, wherein the outlet comprises a first valve channel and a second valve channel in fluid communication with the mould tool cavity, wherein turning the first ultrasound vibration device from the off-state to the on-state exposes the molten injection moulding material to ultrasonic vibration during flow through the a first valve channel, and turning the second ultrasound vibration device from the off-state to the on-state exposes the molten injection moulding material to ultrasonic vibration during flow through the second valve channel.

13. The method according to claim 1, wherein the flow of the molten injection moulding material past a tip of the sonotrode is reduced compared to the flow along the outer wall of the sonotrode.

* * * * *